US010883028B2

(12) United States Patent
Bao et al.

(10) Patent No.: US 10,883,028 B2
(45) Date of Patent: Jan. 5, 2021

(54) ROOM TEMPERATURE CURABLE POLYORANOPOLYSLOXANE SILICONE SEALANT COMPOSITION, THE SILICONE SEALANT AND METHOD FOR PREPARING THEREOF

(71) Applicant: Nano and Advanced Materials Institute Limited, Hong Kong (HK)

(72) Inventors: Su Ping Bao, Hong Kong (HK); Lei Gao, Hong Kong (HK); Ruiqi Chen, Hong Kong (HK); Man Lung Sham, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 112 days.

(21) Appl. No.: 16/231,927

(22) Filed: Dec. 24, 2018

(65) Prior Publication Data

US 2019/0194508 A1    Jun. 27, 2019

Related U.S. Application Data

(60) Provisional application No. 62/708,797, filed on Dec. 26, 2017.

(51) Int. Cl.
| | |
|---|---|
| *C09J 183/06* | (2006.01) |
| *C09J 11/04* | (2006.01) |
| *C08K 3/26* | (2006.01) |
| *C09J 11/06* | (2006.01) |
| *C09J 183/04* | (2006.01) |
| *C08L 83/04* | (2006.01) |
| *C08K 9/04* | (2006.01) |
| *C08G 77/16* | (2006.01) |

(52) U.S. Cl.
CPC ............ *C09J 183/06* (2013.01); *C08K 3/26* (2013.01); *C08L 83/04* (2013.01); *C09J 11/04* (2013.01); *C09J 11/06* (2013.01); *C09J 183/04* (2013.01); *C08G 77/16* (2013.01); *C08K 9/04* (2013.01); *C08K 2003/265* (2013.01)

(58) Field of Classification Search
None
See application file for complete search history.

(56) References Cited

U.S. PATENT DOCUMENTS

| | | | |
|---|---|---|---|
| 3,856,839 A | 12/1974 | Smith et al. | |
| 4,257,932 A * | 3/1981 | Beers ............... | C08K 5/57 524/588 |
| 4,460,740 A | 7/1984 | Arai | |
| 4,464,740 A | 8/1984 | Ono et al. | |
| 4,496,696 A | 1/1985 | Kurita | |
| 4,673,750 A | 6/1987 | Beers et al. | |
| 4,687,829 A | 8/1987 | Chaffee et al. | |
| 4,695,603 A | 9/1987 | Yoshio et al. | |
| 4,797,446 A | 1/1989 | Dietlein et al. | |
| 4,810,748 A | 3/1989 | Spells | |
| 4,847,396 A | 7/1989 | Beers et al. | |
| 4,888,380 A | 12/1989 | Kamis et al. | |
| 4,889,878 A | 12/1989 | Dixon et al. | |
| 4,898,910 A | 2/1990 | Kamis et al. | |
| 4,956,435 A | 9/1990 | Chu et al. | |
| 4,962,151 A | 10/1990 | Mellon | |
| 4,978,706 A | 12/1990 | Dietlein et al. | |
| 5,011,869 A | 4/1991 | Dean et al. | |
| 5,051,455 A | 9/1991 | Chu et al. | |
| 5,053,442 A | 10/1991 | Chu et al. | |
| 5,091,445 A | 2/1992 | Revis | |
| 5,319,050 A | 6/1994 | Kimura et al. | |
| 5,357,025 A | 10/1994 | Altes et al. | |
| 5,364,921 A | 11/1994 | Gray et al. | |
| 5,519,104 A | 5/1996 | Lucas | |
| 5,534,563 A | 7/1996 | Lin et al. | |
| 5,656,710 A | 8/1997 | Newberth, III et al. | |
| 5,928,794 A | 7/1999 | Kalinowski et al. | |
| 5,948,853 A | 9/1999 | Bayly et al. | |
| 5,952,409 A | 9/1999 | Boardman et al. | |
| 6,037,008 A | 3/2000 | Huang et al. | |
| 6,127,503 A | 10/2000 | Fujioka et al. | |
| 6,251,327 B1 | 6/2001 | Bentz et al. | |
| 6,265,516 B1 | 7/2001 | Okawa et al. | |
| 6,284,861 B1 | 9/2001 | Takuman et al. | |
| 6,306,999 B1 | 10/2001 | Ozai et al. | |
| 6,451,440 B2 | 9/2002 | Atwood et al. | |
| 6,562,931 B1 | 5/2003 | Knepper | |
| 6,750,273 B2 | 6/2004 | Chao | |
| 6,753,398 B2 | 6/2004 | Sakamoto et al. | |
| 6,828,355 B1 | 12/2004 | Chu | |
| 6,831,127 B2 | 12/2004 | Fujiki et al. | |
| 6,908,682 B2 | 6/2005 | Mistele | |
| 7,115,695 B2 | 10/2006 | Okamoto et al. | |
| 7,527,870 B2 | 5/2009 | Beger et al. | |
| 7,745,531 B2 | 6/2010 | Schoeley et al. | |
| 8,123,897 B2 | 2/2012 | Kimura et al. | |
| 8,323,749 B2 | 12/2012 | Questel et al. | |

(Continued)

OTHER PUBLICATIONS

NPL Engineering Tool Box, (2003). Viscosity Converting Chart. [online] Available at: https://www.engineeringtoolbox.com/viscosity-converter-d_413.html [Accessed Day Mo. Year]. (Year: 2003).*

*Primary Examiner* — Robert T Butcher
(74) *Attorney, Agent, or Firm* — Idea Intellectual Limited; Margaret A. Burke; Sam T. Yip (57) ABSTRACT

The present invention provides a one-component silicone sealant composition curable when exposed to moisture at room temperature. The resulting silicone sealant has excellent stain-resistance, good overall mechanical performances and good adhesion on both dry and wet substrates. The composition contains modified hydroxyl-terminated polyorganosiloxanes polymer network in different viscosities being cross-linked with branched silicone oil in the presence of an environmental-friendly and tin-free catalyst and cross-linkers while some inert and/or functional nanofillers are added into the composition to provide mechanical and/or functional properties to the resulting silicone sealant. A method for preparing the present composition is also provided.

18 Claims, 2 Drawing Sheets

(56) References Cited

U.S. PATENT DOCUMENTS

| | | |
|---|---|---|
| 8,344,087 B2 | 1/2013 | Maton et al. |
| 8,937,141 B2 | 1/2015 | Sumi et al. |
| 8,987,373 B2 | 3/2015 | Ostendorf et al. |
| 9,567,503 B2 | 2/2017 | Baily et al. |
| 9,670,392 B2 | 6/2017 | Larson et al. |
| 2008/0076864 A1 | 3/2008 | Mogi |
| 2012/0065308 A1* | 3/2012 | Sumi ................... C08L 83/04 524/139 |
| 2014/0087082 A1 | 3/2014 | Altum et al. |
| 2014/0309370 A1* | 10/2014 | Ostendorf ............. C08K 3/36 524/861 |
| 2015/0376488 A1 | 12/2015 | Tan et al. |

* cited by examiner

ROOM TEMPERATURE CURABLE POLYORANOPOLYSLOXANE SILICONE SEALANT COMPOSITION, THE SILICONE SEALANT AND METHOD FOR PREPARING THEREOF

CROSS REFERENCE OF RELATED APPLICATION

This application claims priority from the U.S. Provisional Patent Application Ser. No. 62/708,797 filed Dec. 26, 2017, and the disclosure of which is incorporated herein by reference in its entirety.

FIELD OF THE INVENTION

The present invention generally relates to a high-performance stain-resistant silicone sealant and method for preparing thereof. More specifically, the present invention relates to a room temperature curable one-component silicone sealant which is cured when exposed to moisture at room temperature, has stain-resistant and good overall mechanical performances, and also has good adhesion on both dry and wet surfaces.

BACKGROUND

One-component room temperature vulcanizing (RTV-1) silicone sealants which can be cured when exposing to the moisture are widely used as joint sealant on various substrates such as glass, metal, concrete, stone, and polymer. It is well known that the requirements for the silicone sealants with good mechanical performances and adhesive property on various substrates are different depending on the requirements in different applications. Serious staining problem always exists which limits the application of the conventional silicone sealants, especially for those used on stone substrates (e.g. marble) and the staining of silicone sealant is permanent in those applications, which affects the appearance seriously.

Some patents disclosed that it is outstanding of their silicone sealants with very durable stain-preventing effect by formulation adjustment. For example, U.S. Pat. No. 4,464,740 disclosed a limited amount of specific fluorine containing surface active agent with the silicone sealant composition to cure so as to prevent the appearance of surface staining; U.S. Pat. No. 6,265,516 disclosed an anti-staining additive comprising a higher saturated aliphatic acid ester-modified organosilicone compound that is produced by carrying out an addition reaction and the content of the additive ranges from 0.01 to 50 wt % in a polyorganosiloxane composition that is cured at room temperature by a condensation reaction; U.S. Pat. No. 5,952,409 disclosed a method to improve stain resistance to the substrates by using organoborance amine complexes to the composition.

Some patents disclosed improved mechanical performance for cured silicone sealants. For example, U.S. Pat. No. 6,451,440 disclosed a silicone sealant composition exhibits improved tensile, elongation and adhesive properties; U.S. Pat. No. 4,687,829 disclosed an improved silicone elastomer sealant composition produced by mixing alkoxy functional polydiorganosiloxane having alkoxysilethylene ends with a combination of trifunctional or tetrafunctional silane crosslinker and dlfunctional silane chain extender to adjust their physical properties.

Many patents disclosed different methods to improve the adhesive properties of silicone sealants on various substrates including dry and wet surfaces. For example, U.S. Pat. No. 5,051,455 disclosed a moisture curing silicone sealant which adheres to glass, metal, and polymer substrates. The silicone sealant is produced by mixing a trilkoxysilethylene end-blocked polydiorganosiloxane end-blocked polydiorganosiloxane, a trialkoxysilane crosslinker, and a beta-dicarbonyl titanium catalyst with a precipitated calcium carbonate filler having a fatty acid treated surface; U.S. Pat. No. 6,562,931 disclosed room temperature vulcanizable silicone compositions with improved adhesion to acrylic. An amino-functional silane which was used as an adhesion promoter is the key for the improved adhesive performance of the silicone sealant on acrylic substrate; U.S. Pat. Nos. 5,928,794 and 5,364,921 disclosed silicone sealants which show self-adhesion to substrates. The compositions comprise a crosslinker having hydrosilyl groups and platinum catalysts; U.S. Pat. Nos. 5,053,442, 4,810,748 and 4,889,878 disclosed silicone sealants showing good adhesion on concrete surface. In these patents, epoxy- or amino-functional silanes were used as adhesion promoters to improve the adhesion of silicone sealant on concrete. In addition to the adhesion promoter, using primer is another way to improve the adhesion of silicone sealant on the substrates; U.S. Pat. No. 6,037,008 disclosed aqueous primer system comprising mixtures of silanes which can be used to improve the adhesion for various substrates having either porous or non-porous surfaces.

U.S. Pat. No. 3,856,839 disclosed a silanol chain-stopped polydiorganosiloxane fluid which cured catalyzed by an alkanedioxy titanium chelates; U.S. Pat. No. 7,115,698 disclosed an organic polymer having at least one silicone-containing group crosslinked by forming siloxane bonds and a specific metal salt of a carboxylic acid; U.S. Pat. No. 5,091,445 disclosed a silicone sealant prepared by curing and crosslinking methylhydrosiloxanes by contacting and forming a mixture of an alkyl amide or an allyl ester with at least one methylhydrosiloxane in the presence of a Group VIII metal catalyst.

More recent patents disclosed new silicone sealant compositions with distinguished features including anti-bacterial property, gas permeability, solvent resistance, antistatic property and other additional functions. For example, U.S. Pat. No. 9,567,503 disclosed a curable phenylorganosiloxane polymer composition with low gas permeability; U.S. Published Patent Application Pub. No. 20140087082 disclosed a room temperature vulcanisable silicone compositions which are storage stable, have good freeze/thaw characteristics in the absence of polar solvents; U.S. Published Patent Application Pub. No. 20080076864 disclosed a silicone rubber composition exhibited insulation and antistatic properties.

Although tremendous efforts have been devoted to the compositions and performances of silicone sealants and it has also attracted increasing attention of nanotechnology in the field of silicone sealant materials. Therefore, new compositions for silicone sealant which have excellent stain-resistance, good overall mechanical performances and good adhesion for both dry and wet surfaces and by utilizing nanomaterials to modify the developed new silicone sealants in order to achieve other additional functions and being capable of accommodating wider applications are needed

SUMMARY OF THE INVENTION

An aspect of the present invention is to provide a new class of room temperature curable composition for silicone sealant with excellent stain-resistance, good overall mechanical performances and good adhesion for both dry and wet surfaces. Key components in the present composition include but not limited to a liquid polyorganosiloxane polymer, a branched silicone oil, a cross-linking agent, an environmentally-friendly and tin-free catalyst, inert nano-fillers, and/or functional nanofillers.

According to an exemplary embodiment of the present invention, the liquid polyorganosiloxane polymer used in the composition is represented by the following formula:

wherein R is independently selected from the group consisting of —H, $C_{1-8}$ alkyl group, vinyl group, and phenyl group; n is an integer which the liquid polyorganosiloxane polymer has a viscosity of 25 to 1,000,000 cSt at 25° C., preferably 1,500 to 100,000 cSt at 25° C.

In a preferred embodiment, the viscosity of the liquid polyorganosiloxane polymer of the present invention is from 1,500 to 100,000 cSt at 25° C.

According to an exemplary embodiment of the present invention, the branched silicone oil is represented by the following formula:

wherein R is independently selected from the group consisting of $C_{1-8}$ alkyl group, vinyl group, and phenyl group; R' is independently selected from hydroxyl, a $C_{1-8}$ alkoxy group, a $C_{1-8}$ alkyl group, a vinyl group, or a phenyl group; X is selected from oxygen or ethylene group; a, b and c are independently selected from an integer and the sum of a, b and c is that the branched silicone oil has a viscosity of 25 to 10,000 cSt at 25° C.

In a preferred embodiment, the branched silicone oil is a MDT-type silicone oil, where M stands for $Me_3SiO$; D stands for $Me_2SiO_2$; T stands for $MeSiO_3$.

In another embodiment, the branched silicone oil is with reactive groups capable of adjusting viscosity of the polysiloxane polymer chains in the liquid polyorganosiloxane polymer of the present invention in the presence of the environmental-friendly and tin-free catalyst.

In other embodiment, the branched silicone oil acts as chain extender for the liquid polyorganosiloxane polymer of the present invention.

According to an exemplary embodiment of the present invention, the cross-linking agent comprises two or more reactive groups reacting with silicon-bonded hydroxyl groups of the liquid polyorganosiloxane polymer of the present invention.

In another embodiment, the cross-linking agent is an organosilicone compound having tri-functional silane for cross-linking and optionally at least one bi-functional silane being chain extenders capable of extending the length of the polysiloxane polymer chains in the liquid polyorganosiloxane polymer of the present invention before the cross-linking occurs.

In other embodiments, the cross-linking agent includes vinyltrimethoxysilane (ViTMS), vinyltriethoxysilane (ViTES), dimethoxydimethylsilane (DMDMS), vinylmethyldimethoxysilane (ViMDMS), triethoxymethylsilane (TEMS), poly(methyltriethoxysilane) (polyMTES), methyltrimethoxysilane (MTMS), tetraethyl orthosilicate (TEOS), methyltris(methylethylketoxime)silane (MTMOS), vinyltris(methylethylketoximine)silane (ViTMOS), and phenyltris(methylethylketoxime)silane (PhTMOS).

According to an exemplary embodiment of the present invention, the environmental-friendly and tin-free catalyst is an inorganic compound capable of promoting reaction between the liquid polyorganosiloxane polymer and branched silicone oil.

In one embodiment, the environmental-friendly tin-free catalyst is one or more titanium compounds and/or any complexes thereof.

In another embodiment, the one or more titanium compounds include tetrabutyl titanate, isopropyl titanate, and titanium chelates complex.

According to an exemplary embodiment of the present invention, the inert nanofiller is a calcium compound without conferring any functional properties to and/or modifying any properties of the present silicone sealant. Preferably, the inert nanofiller is calcium carbonate.

In another embodiment, the calcium carbonate nanofiller is one or more of nano calcium carbonate, precipitated calcium carbonate, and/or ground calcium carbonate.

The functional nanofiller of the present invention can be a reinforcing nanofiller or a non-reinforcing nanofiller.

In an embodiment, the functional nanofiller is one or more of organic and/or inorganic compounds capable of improving mechanical properties of the present silicone sealant and/or conferring any functions to the present silicone sealant.

In another embodiment, the inorganic functional nanofiller comprises one or more of fumed silica, precipitated silica, iron oxide, titanium dioxide, mica, aluminum oxide, zinc oxide, calcium oxide, anhydrous calcium chloride, anhydrous magnesium chloride, calcium hydroxide, sodium hydrate, potassium hydrate, and bentonite.

In other embodiment, the organic functional nanofiller comprises carbon black, acrylonitrile butadiene styrene copolymers, and polybutylene terephthalate.

In yet another embodiment, the functional nanofiller can confer antibacterial property to the present silicone sealant.

In other embodiment, the functional nanofiller is a water-absorbent nanofiller being an adhesive promoter to improve the adhesion of the present silicone sealant on wet substrate.

Another aspect of the present invention relates to a method for preparing the present silicone sealant. In general, the present method includes the following steps:

a) providing polydimethylsiloxanes and modifying thereof with a multi-functional siloxane to become hydroxyl-terminated polydimethylsiloxanes;

b) mixing one or more of the afore-mentioned hydroxyl-terminated polydimethylsiloxanes in different viscosities with the branched silicone oil of the present invention;

c) adding the inert nanofiller of the present invention under ambient conditions into the mixture of the hydroxyl-terminated polydimethylsiloxanes and the branched silicone oil followed by mixing for a first period of time under ambient conditions until a paste is obtained;

d) continuously mixing the paste obtained from step (c) under vacuum at an elevated temperature for a second period of time until a base material is obtained;
e) cooling down the base material obtained from step (d) under vacuum until the base material reaches a lower temperature than the afore-mentioned elevated temperature;
f) adding the cross-linking agent of the present invention into the base material after the cooling followed by mixing under vacuum for a third period of time;
g) adding the environmental-friendly and tin-free catalyst into the mixture obtained from step (f) under $N_2$ atmosphere followed by mixing for a fourth period of time;
h) continuously mixing the mixture obtained from step (g) under vacuum for a fifth period of time before the final product, i.e., the present silicone sealant is formed. The as-prepared silicone sealant composition of the present invention is curable when exposed to moisture because it contains reactive hydroxyl group which bonds to silicon. After curing, the present silicone sealant is expected to form a rubber-like material for sealing on various substrates including but not limited to glass, metal, concrete, stone, graphite, marble, polymer and any porous substrate.

In an exemplary embodiment, the present silicone sealant contains 30-70 wt. % liquid polyorganosiloxane polymer, 5-20 wt. % branched silicone oil, 0.1-4 wt. % cross-linking agent, 0.01-5 wt. % environmental-friendly and tin-free catalyst, 30-70 wt. % inert nanofiller.

In another embodiment, the weight ratio between the polyorganosiloxane polymer to the branched silicone oil in the present silicone sealant is from 6:4 to 9:1.

Optionally, one or more functional nanofillers as additives are added with the environmental-friendly and tin-free catalyst into the mixture of the hydroxyl-terminated polydimethylsiloxanes, branched silicone oil and inert nanofiller after cross-linking to impart different functionalities to the resultant silicone sealant. The one or more functional nanofillers include but not limited to antibacterial agent, adhesive promoter, and anti-fouling agent. In one embodiment, the functional nanofiller is 0-5 wt. % in the present silicone sealant.

Exemplarily, the inert nanofiller is subjected to surface treatment before being added into the mixture of hydroxyl-terminated polydimethylsiloxanes and branched silicone oil in order to enhance the compatibility thereof with the hydroxyl-terminated polydimethylsiloxanes and/or branched silicone oil. In one embodiment, the inert nanofiller is surface-treated with a fatty acid or a fatty acid ester or organosiloxanes.

BRIEF DESCRIPTION OF THE DRAWINGS

Embodiments of the present invention are described in more detail hereinafter with reference to the drawings, in which.

DETAILED DESCRIPTION OF PREFERRED EMBODIMENTS

The following description and the corresponding embodiments are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

The present invention provides a one-component silicone sealant composition, which is cured rapidly to produce reaction products having stain-resistance for various substrates and/or adhesive properties on wet substrates. The composition includes a) a moisture-curable polyorganosiloxane polymer, b) a branched silicone oil such as MDT silicone oil, crosslinkers, inert nanofillers and optionally some functional nanofillers such as water-absorbent compounds as adhesive promoters for improving adhesion of the present silicone sealant on wet substrates.

The moisture-curable polyorganosiloxane contains reactive hydroxyl groups bonds to silicon and a cure system reactive with hydroxyl groups in the presence of moisture. When the one-component silicone sealant is exposed to atmospheric moisture at room temperature, the silicone sealant is expected to cure to form a rubber-like material applicable on various substrates.

The branched silicone oil is used to react with the moisture-curable polyorganosiloxane to adjust the viscosity thereof.

The crosslinkers or cross-linking agents contain two and/or three groups reactive with the silicon-bonded hydroxyl groups of the moisture-curable polyorganosiloxane.

The moisture-curable polyorganosiloxane and branched oil silicone are reacted in the present of a catalyst which is environmental-friendly because it is tin-free. For example, calcium carbonate is used as the catalyst.

The inert nanofillers can be reinforcing or non-reinforcing nanofillers. The reinforcing inert nanofillers improve the mechanical properties such as tensile strength, elongation-to-break, hardness, tear strength, and stain-resistance, etc.

One or more functional additives or adhesive promoters can be optionally added. For improving the adhesion of the silicone sealant on wet substrates, adhesive promoters such as some water-absorbent compounds can be added into the silicone sealant composition before curing.

In one embodiment of the present invention, the polyorganosiloxane polymer contains at least two hydroxyl groups, preferably terminal hydroxyl groups as in the following formula:

where R is independently selected from —H, a $C_{1-8}$ alkyl group, a vinyl group, or a phenyl group; n is an integer that the polymer has a viscosity of 1,500-100,000 cSt at 25° C. The polyorganosiloxane polymer can be used as either a single viscosity composition or a mixture of various viscosity compositions. Preferably, at least one R is methyl group. In an exemplary embodiment, the polyorganosiloxane polymer is polydimethylsiloxane with terminal hydroxyl groups.

The branched silicone oil is a MDT type silicone oil described as the following formula:

where R is independently selected from a $C_{1-8}$ alkyl group, a vinyl group, or a phenyl group; R' is independently selected from hydroxyl, a $C_{1-8}$ alkoxy group, a $C_{1-8}$ alkyl group, a vinyl group, or a phenyl group; R and R' may be the same or different; X may be oxygen group or ethylene group; And a, b and c are such the number that the branched silicone oil with a viscosity of 25 to 10,000 cSt at 25° C. The branched silicone oil with reactive groups can adjust the viscosity of the polysiloxane polymer chains and react polyorganosiloxane polymer in the presence of catalyst.

The cross-linking agents comprise two and/or three groups reactive with silicon-bonded hydroxyl groups of the polymer. Examples of cross-linking compounds or cross-linkers include vinyltrimethoxysilane (ViTMS), vinyltri-ethoxysilane (ViTES), dimethoxydimethylsilane (DMDMS), vinylmethyldimethoxysilane (ViMDMS), tri-ethoxymethylsilane (TEMS), poly(methyltriethoxysilane) (polyMTES), methyltrimethoxysilane (MTMS), tetraethyl orthosilicate (TEOS), methyltris(methylethylketoxime)silane (MTMOS), vinyltris(methylethylketoximine)silane (ViTMOS), and phenyltris(methylethylketoxime)silane (PhTMOS).

Figure 1:
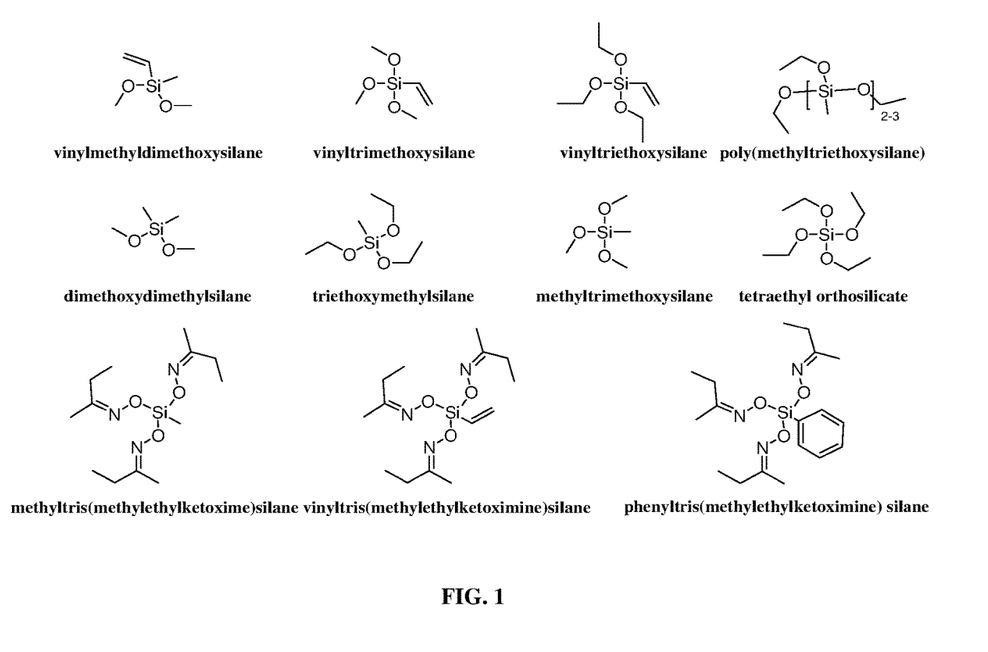
FIG. 1 illustrates the chemical formula of different cross-linking agents according to different embodiments of the present invention.

The chemical formulae of the above-mentioned cross-linking agent are shown in FIG. 1.

The crosslinking agent may be present in a range of 1 to 10 parts by weight per 100 parts of the polyorganosiloxane polymer in the silicone sealant composition, preferably from 2 to 8 parts by weight per 100 parts by weight of the polyorganosiloxane polymer. The cross-linking agent can be one or more of the silane compounds as set forth herein or in FIG. 1. Although the bifunctional silane is described as cross-linking agent in the present invention, in some cases, because these bifunctional silanes serve as chain extenders which can extend the length of the polysiloxane polymer chains of the polyorganosiloxane polymer before crosslinking occurs, bifunctional silane cannot be used alone as cross-linking agent in the present invention. At least one tri-functional silane is thereby used with the bifunctional silane for cross-linking purpose.

The catalyst comprises the organometallic compounds and/or any complex thereof which can catalyze the curing of the silicone sealant composition in the presence of moisture at room temperature. Tin-free titanium compounds and/or complexes are some of the candidates. Some examples are tetrabutyl titanate, isopropyl titanate, and titanium chelates complex.

The catalyst may be present in a range of 0.01 to 5 parts by weight per 100 parts of polyorganosiloxane polymer. The catalyst can be a mixture of different titanium compounds for use in silicone sealant synthesis.

The inert filler can be a reinforcing nanofiller, which can improve the mechanical properties of the silicone sealant and/or a non-reinforcing filler. The inert filler may be nano calcium carbonate, precipitated calcium carbonate, ground calcium carbonate, or any mixture thereof.

The inert nanofiller may be present in a range of 25 to 400 parts by weight per 100 parts of the polyorganosiloxane polymer in the silicone sealant composition, preferably from 50 to 200 parts by weight per 100 parts by weight of the polyorganosiloxane polymer. The inert nanofiller can be one or more of different reinforcing and/or non-reinforcing fillers.

In addition, the inert nanofiller is preferably used after surface treatment. For example, a fatty acid or a fatty acid ester or organosiloxanes are used to treat the surface of the fillers before added into the silicone sealant composition to enhance compatibility thereof with the polyorganosiloxne polymer. For different inert nanofillers, the surface treatment may be different.

The functional nanofiller or additive may be one or more of organic and/or inorganic compounds conferring some special properties to the silicone sealant. For inorganic compounds, example includes antibacterial agents such as zinc oxide. The additive may be inorganic water-absorbent nanofillers as adhesive promoter to improve the adhesion of silicone sealant on wet substrate. Examples include: calcium oxide, anhydrous calcium chloride, anhydrous magnesium chloride, calcium hydroxide, sodium hydrate, potassium hydrate, and bentonite. The adhesive promoter can be used as one component or as a mixture of different adhesive promoters.

The functional nanofillers may be present in a range of 0 to 5 parts by weight per 100 parts of the polyorganosiloxane polymer.

The as-prepared one-component silicone sealant according to the present invention are stable in storage in the absence of moisture but is cured when exposed to atmospheric moisture at room temperature. The resulting composition may be employed as joint sealants for cavities in building structures.

For better understand of the present invention, the following examples are offered by way of illustration but not limitation.

EXAMPLES

Figure 2:
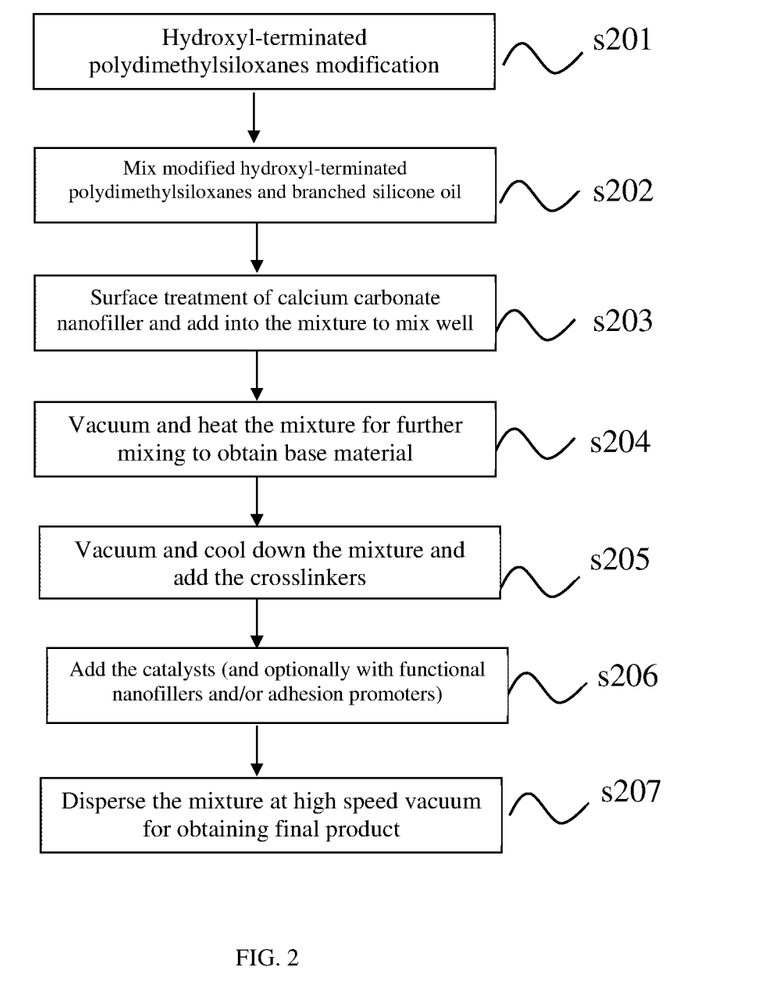
FIG. 2 illustrates as a flow chart a method for preparing the present silicone sealant according to an embodiment of the present invention.

FIG. 2 shows an example of the present preparation method for the silicone sealant of the present invention. First of all, hydroxyl-terminated polydimethylsiloxanes were used as the polyorganosiloxane polymer and modified (s201) by using a multi-functional siloxane in order to improve the shelf life of the as-prepared silicone sealant. The multi-functional siloxane can be tetraethyl orthosilicate, tetramethyl orthosilicate, vinyltrimethoxysilane, vinyltriethoxysilane, methyltriethoxysilane, methyltrimethoxysilane or a mixture thereof. In this example, the modified hydroxyl-terminated polydimethylsiloxanes by said multi-functional siloxane are alkoxyl-terminated polydimethylsiloxanes or PDMS-(OMe)$_3$. A mixture of the modified hydroxyl-terminated polydimethylsiloxanes with various viscosities and a branched silicone oil were formed (s202) by adding them into a planetary mixer equipped with a high-speed dispersion disc followed by mixing. Depending on the application of the resulting silicone sealant, the weight ratio between the polyorganosiloxane polymer and the branched silicone oil can be in a range of 6-9:4-1. A surface-treated calcium carbonate nanofillers were added into the mixture of the modified hydroxyl-terminated polydimethylsiloxanes and the branched silicone oil and mixed for 30 min under room temperature and constant pressure to obtain a paste (s203). The mixing continued under vacuum and the temperature was set to 90-120° C. for 1-3 hours to obtain a base material (s204). The base material was cooled down under vacuum below 60° C. followed by adding cross-linking agent into the base material and mixed them at high speed under vacuum for 30 minutes (s205). The mixture may be cooled below 50° C. if necessary. Environmental-friendly and tin-free catalyst was then added into the mixture under $N_2$ atmosphere and mixed for another 10 min (s206), where functional nano-fillers and/or adhesion promoters were optionally added together with the catalyst, depending on the specific functions required. Finally, the mixture was dispersed at high speed under vacuum for another 20-60 min before obtaining the final product, i.e., the present silicone sealant (s207).

The weight percentage of different components used in the composition of the silicone sealant prepared according to different embodiments of the present invention are listed in Table 1, Table 2 and Table 3, respectively.

The silicone composition was subjected to ambient moisture-curing conditions and the following properties were measured: tack free time (measured in according with ASTM C679); hardness (measured in according with ASTM D2240); tensile strength & elongation (measured in accordance with ASTM D412; tear strength (measured in accordance with ASTM D624 using Die B); peel strength (measured in accordance with ASTM 294); tensile adhesive strength (measured in accordance with ISO 8339); stain (measured in accordance with ASTM 1248).

The term "cure" or "curing" used herein refers to a change of a material in state and/or structure in a material under some conditions, such as time, temperature, moisture. The term covers both partial curing and complete curing.

Below are further illuminations of how the tests were carried out on different specimens of the silicone sealant listed in Tables 1-3 according to international standards:

The tack free time in the present invention is defined as the time required for a silicone sealant to form a non-tacky surface film (ASTM C679). A sample is spread on a clean surface and a clean strip of polyethylene film is laid on a fresh surface of silicone sealant sample and pulled off periodically until the strip is pulled cleanly away from the sample. The time is recorded as tack free time in minutes.

The tensile strength and elongation-to-break of silicone sealant specimens were characterized by a universal testing system (MTS, model E104) with a gauge distance of 80 mm and a cross speed of 500 mm/min according to ASTM D 412. The specimens were cured for 7 days under standard condition (room temperature and humidity of 50-60%) and cut into dumbbell shape before tensile properties tests. The tensile force and displacement of the specimens were recorded during each tensile test. The tensile strength was calculated using the maximum force at rupture and cross-sectional area of unstrained specimen as follow:

$$Ts=F(BE)/A$$

in which Ts is the tensile strength, F(BE) is the maximum force at rupture, and A is the cross sectional areal of the specimen before tensile behavior. The elongation at break was calculated by the ratio between the extended distance at the point of specimen rupture and the original distance of the specimen.

The silicone sealant specimens were applied on granite substrate according to ASTM C794. The specimens were cured for 28 days under standard condition (room temperature and humidity of 50-60%) before peel strength test. Peel strength test were conducted in the universal testing system with tension grips capable of pulling at the peel-off rate of 50 mm/min. The peak strength was recorded based on the peel force and peel displacement.

Tear strength test was carried out using trouser-shaped and crescent-shaped specimens based on the requirements of ASTM D 624. The silicone sealant specimens were cured for 7 days under standard condition (room temperature and humidity of 50-60%) before tear strength test. The universal testing system with tension grips were used to obtain tear strength at the rate 500 mm/min for crescent-shaped specimens. The tear strength can be calculated according to the maximum force divided by the thickness of the test piece.

Hardness test was carried out according to ASTM D2240. The thickness of silicone sealant sample should be more than 6 mm after the silicone sealant was cured on a cement plate substrate. A Shore durometer (type A) was used to test the hardness of the sample after curing of the sample under standard condition (room temperature and humidity of 50-60% for 28 days).

Tensile adhesive strength of silicone sealants were carried out according to ISO 8339. Granite was used as substrate, and the specimens were cured under standard condition (room temperature and humidity of 50-60% for 28 days) before testing. Tensile test machine, with recording device, was used with a rate of 5.5 mm/min. The tensile adhesive strength was calculated using the force magnitude at rupture and cross-sectional area of unstrained specimen as follow:

$$T_{AS}=F/A$$

where:
$T_{AS}$: tensile adhesive strength, the stress at rupture;
F: the force magnitude at rupture;
A: cross-sectional area of unstrained specimen.

Stain tests for uncured and cured silicone sealant specimens were carried out according to ASTM C1248. The silicone sealant specimens were applied on marble (light color) substrate and cured at room temperature for 21 days before moving into an oven with the temperature of 70° C. The depth of staining in the light color marble substrate were tested three-dimensionally (including length of stain in the horizontal and vertical directions of the surface of the subtrate and interior of the substrate) after another 28 days.

The physical properties of different examples and some market-available products are show in Table 4.

TABLE 1

| Example 1 | |
| --- | --- |
| Component | Weight % |
| Modified hydroxyl-terminated PDMS and branched silicone oil | 48.5 |
| Calcium carbonate nanofiller | 48.5 |
| Crosslinking agent | 4.0 |
| Functional additive | none |
| Catalyst compound | 2.0 |

TABLE 2

| Example 2 | |
| --- | --- |
| Component | Weight % |
| Modified hydroxyl-terminated PDMS and branched silicone oil | 46.3 |
| Calcium carbonate filler | 46.3 |
| Crosslinking agent | 1.9 |
| Functional additive (adhesion promoter) | 4.6 (CaO) |
| Catalyst compound | 0.9 |

TABLE 3

Example 3

| Component | Weight % |
|---|---|
| Modified hydroxyl-terminated PDMS and branched silicone oil | 47.4 |
| Calcium carbonate nanofiller | 47.4 |
| Crosslinking agent | 1.9 |
| Functional additive (adhesion promoter) | 2.4 (CaCl$_2$) |
| Catalyst compound | 1.0 |

TABLE 4

Physical properties of invented silicone sealants and other market available products

| Test | Example 1 | Example 2 | Example 3 | Market available product 1 | Market available product 2 | Market available product 3 |
|---|---|---|---|---|---|---|
| Tack free time (min) | 25 | 25 | 30 | 60 | 40 | 40 |
| Hardness, Shore A | 33 | 48 | 43 | 33 | 28 | 41 |
| Tensile strength (psi) | 377 | 285 | 238 | 339 | 189 | 341 |
| Elongation (%) | 460 | 280 | 170 | 580 | 440 | 470 |
| Tear strength (ppi) | 80 | 60 | 76 | 86 | 61 | 87 |
| Peel strength (ppi) | 50 | 32 | 26 | 45 | 21 | 47 |
| Tensile adhesive strength (psi) on dry granite | 180 | 103 | 118 | 117 | 44 | 139 |
| Tensile adhesive strength (psi) on wet granite | 0 | 65 | 94 | 0 | 0 | 0 |
| Stain$^a$ (mm) | 0, 0, 0 | 0, 0, 0 | 0, 0, 0 | 0.5, 0.5, 0.5 | 1.0, 0.5, 0.5 | 4.5, 1.0, 1.0 |

Note:
$^a$the stain length on horizontal (surface), vertical (surface), and vertical (internal)

From Table 4, it can be seen that the three most outstanding performances compared to the market products are: the time required for a silicone sealant to form a non-tacky surface film according to the international standard ASTM C679, i.e, the tack free time, which is equal to or less than 30 minutes; the tensile adhesive strength (psi) on wet substrate, e.g., wet granite, which is 65 psi or higher measured according to the international standard ISO 8339; and the stain-resistance which the stain in terms of width and depth in the light color marble substrate is substantially absent according to the international standard ASTM C1248 when the silicone sealant specimens were applied on the marble substrate and cured at room temperature for 21 days before moving into an oven with the temperature of 70° C.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

As described herein, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

The term "independently selected from" refers to referenced groups being the same, different, or a mixture thereof, unless the context clearly indicates otherwise. Thus, under this definition, the phrase "X1, X2, and X3 are independently selected from" would include the scenario where, for example, X1, X2, and X3 are all the same, where X1, X2, and X3 are all different, where X1 and X2 are the same but X3 is different, and other analogous permutations.

In the methods described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

The term "moisture-curable" described herein is used to refer to a composition, formulation, or complex that is completely cured or partially cured at room temperature and under about 50% humidity or higher, or when the composition, formulation or complex is exposed to a medium containing water or moisture at a concentration equivalent to or more than the afore-mentioned humidity at room temperature.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A room temperature curable composition for a silicone sealant, comprising:
   30 to 70 wt. % of polyorganosiloxane polymer with a viscosity of 1,500 to 100,000 cSt at 25° C.;
   5 to 20 wt. % of branched silicone oil with a viscosity of 25 to 10,000 cSt at 25° C.;
   0.1 to 4 wt. % of two or more cross-linking compounds, each of the cross-linking compounds having two to three reactive groups being reactive with silicon-bonded hydroxyl groups of the polyorganosiloxane polymer;
   0.01 to 5 wt. % of one or more tin-free catalysts, wherein the one or more tin-free catalysts comprise titanium compounds selected from one or more of tetrabutyl titanate, isopropyl titanate, titanium chelates complex, or any complexes thereof;
   30 to 70 wt. % of one or more inorganic inert nanofillers; and
   0 to 5 wt. % of one or more functional nanofillers,
   wherein the silicone sealant has a tack free time of equal to or less than 30 minutes according to ASTM C679, and a cured silicone sealant has a tensile adhesive strength on a wet substrate at 65 psi or higher according to ISO 8339, and stain-resistance where the stain in terms of width and depth on a substrate is substantially absent according to the ASTM C1248 when the silicone sealant is applied on the substrate and cured at room temperature for 21 days before being subjected into an oven with a temperature of about 70° C.

2. The room temperature curable composition of claim 1, wherein said polyorganosiloxane polymer is represented by the following formula:

wherein R is independently selected from —H, a $C_{1-8}$ alkyl, vinyl group, or phenyl group;
n is an integer such that the polyorganosiloxane polymer has a viscosity of 1,500 to 100,000 cSt at 25° C.

3. The room temperature curable composition of claim 1, wherein said branched silicone oil is represented by the following formula:

wherein R is independently selected from a $C_{1-8}$ alkyl, vinyl, or phenyl group; R' is independently selected from a hydroxyl, $C_{1-8}$ alkoxy, $C_{1-8}$ alkyl, vinyl, or phenyl group; X is selected from oxygen or ethylene group; a, b and c are independently selected from an integer and the sum of a, b and c is that the branched silicone oil has a viscosity of 25 to 10,000 cSt at 25° C.

4. The room temperature curable composition of claim 2, wherein said polyorganosiloxane polymer is modified by a multi-functional siloxane to become a modified hydroxyl-terminated polyorganosiloxane polymer before reacting with the branched silicone oil in the presence of the one or more tin-free catalysts.

5. The room temperature curable composition of claim 3, wherein said R and R' are the same or different groups.

6. The room temperature curable composition of claim 3, wherein said branched silicone oil is MDT-type silicone oil.

7. The room temperature curable composition of claim 4, wherein the multi-functional siloxane comprises tetraethyl orthosilicate, tetramethyl orthosilicate, vinyltrimethoxysilane, vinyltriethoxysilane, methyltriethoxysilane, methyltrimethoxysilane, or any combination thereof.

8. The room temperature curable composition of claim 4, wherein said R is both substituted by methyl group and said modified hydroxyl-terminated polyorganosiloxane polymer is modified hydroxyl-terminated polydimethylsiloxane.

9. The room temperature curable composition of claim 1, wherein the two or more cross-linking compounds comprise vinyltrimethoxysilane, vinyltriethoxysilane, dimethoxydimethyl silane, vinylmethyldimethoxysilane, triethoxymethylsilane, poly(methyltriethoxysilane), methyltrimethoxysilane, tetraethyl orthosilicate, methyltris(methylethylketoxime)silane, vinyltris(methylethylketoxime)silane, and phenyltris(methylethylketoxime)silane; and
wherein at least one of the cross-linking compounds is a tri-functional silane.

10. The room temperature curable composition of claim 9, wherein another one of the two or more cross-linking compounds is a bifunctional silane.

11. The room temperature curable composition of claim 1, wherein the one or more inorganic inert nanofillers are one or more calcium carbonates nanofillers comprising nano calcium carbonate, precipitated calcium carbonate, and/or ground calcium carbonate.

12. The room temperature curable composition of claim 1, wherein the one or more inorganic inert nanofillers are surface-treated with a fatty acid, a fatty acid ester or organosiloxanes.

13. The room temperature curable composition of claim 1, wherein said one or more functional nanofillers comprise antibacterial agent, adhesive promoter, and anti-fouling agent.

14. The room temperature curable composition of claim 13, wherein said adhesive promoter are water-absorbent for improving the adhesion of silicone sealant on said wet substrate comprising calcium oxide, anhydrous calcium chloride, anhydrous magnesium chloride, calcium hydroxide, sodium hydrate, potassium hydrate, and bentonite.

15. A method for preparing the composition of claim 1, comprising:
   a) providing 100 parts of polydimethylsiloxanes in different viscosities and modifying thereof with a multi-functional siloxane to become modified hydroxyl-terminated polydimethylsiloxanes;
   b) mixing said modified hydroxyl-terminated polydimethylsiloxanes with the branched silicone oil;
   c) adding the one or more inorganic inert nanofillers at 1 to 10 parts by weight per 100 parts of the polydimethylsiloxanes under ambient conditions into the mixture of the modified hydroxyl-terminated polydimethylsiloxanes and the branched silicone oil followed by mixing for a first period of time under ambient conditions until a paste is obtained;
   d) continuously mixing the paste obtained from step (c) under vacuum at an elevated temperature for a second period of time until a base material is obtained;
   e) cooling down the base material obtained from step (d) under vacuum until the base material reaches a reduced temperature lower than said elevated temperature;
   f) adding the two or more cross-linking compounds 25 to 400 parts by weight per 100 parts of the polydimethylsiloxanes into the base material after the cooling followed by mixing under vacuum for a third period of time;
   g) adding the one or more tin-free catalysts at 0.01 to 5 parts by weight per 100 parts of the polydimethylsiloxanes into the mixture obtained from step (f) under $N_2$ atmosphere followed by mixing for a fourth period of time;
   h) continuously mixing the mixture obtained from step (g) under vacuum for a fifth period of time.

16. The method of claim 15, wherein the one or more functional nanofillers are added at no more than 5 parts by weight per 100 parts of the polydimethylsiloxanes with the one or more tin-free catalyst in step (g) into the mixture obtained from step (f).

17. The method of claim 15, wherein said first, second, third, fourth and fifth period of time is from 10 minutes to 3 hours; said elevated temperature is from 90 to 120° C. and said reduced temperature is about 60° C. or lower.

18. A silicone sealant cured from exposing the composition of claim 1 to moisture at room temperature.

* * * * *